Oct. 21, 1952  L. E. GROSBOLL  2,614,367
PRESSURE REGULATOR
Filed Dec. 28, 1945  2 SHEETS—SHEET 2
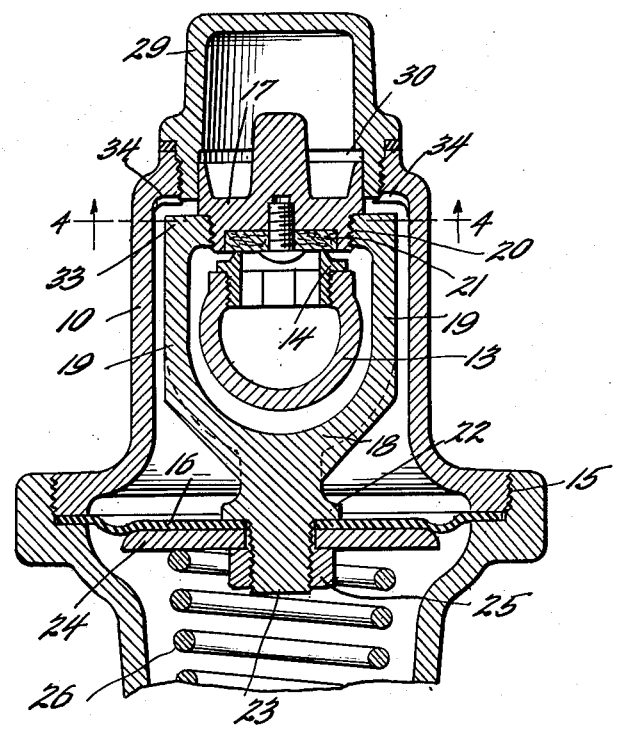
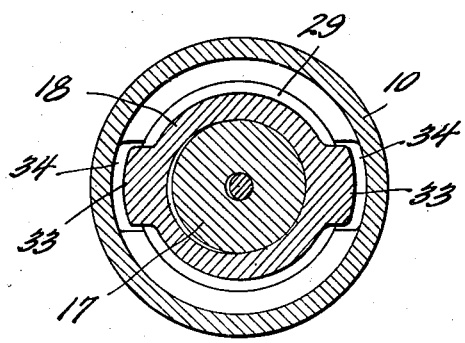
Inventor
Lorin E. Grosboll,
By Cushman, Darby & Cushman
Attorneys Patented Oct. 21, 1952

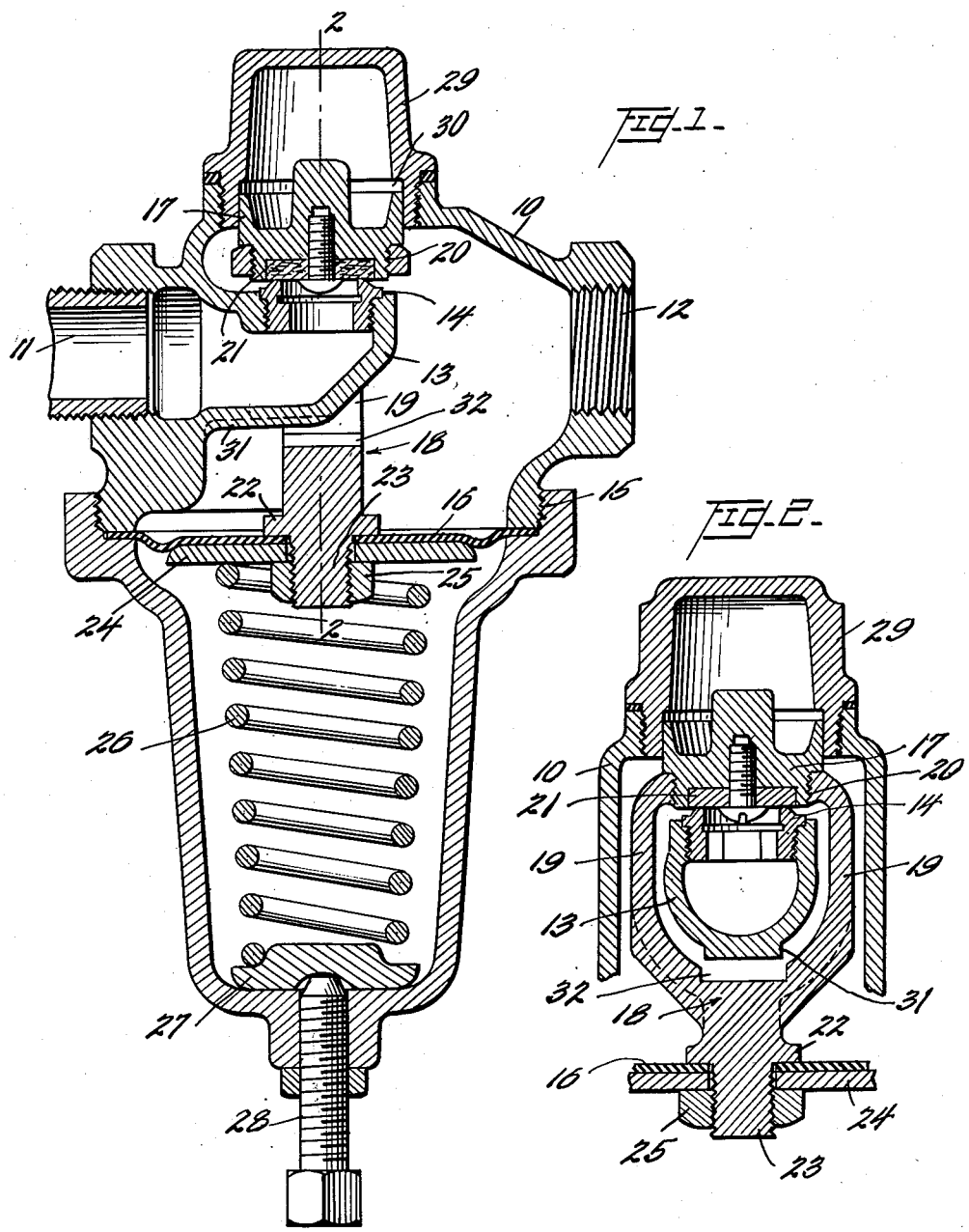

2,614,367

UNITED STATES PATENT OFFICE 2,614,367

PRESSURE REGULATOR

Lorin E. Grosboll, Decatur, Ill., assignor to Mueller Co., Decatur, Ill., a corporation of Illinois Application December 28, 1945, Serial No. 637,629

5 Claims. (Cl. 50—23)

The present invention relates to fluid pressure regulators.

Generally in fluid pressure regulators of the diaphragm type a valve is connected with the diaphragm and opens or closes according to the fluid pressures to which the diaphragm is subjected, said diaphragm being made of a material which is flexible and relatively fragile. The valve is usually removable from its connecting means with the diaphragm for repair or renewal, and since provision is made for ready access to the valve, removal thereof can be accomplished without disassembling the regulator. Due to corrosion or other reasons, considerable manipulation or pressure is required to loosen and remove the valve from its connecting means with the diaphragm, and such manipulation or pressure is translated to the diaphragm, resulting in tension and strain which is likely to damage the diaphragm. Similarly, there is tension and strain on the diaphragm when the valve is replaced. As will be evident, any injury to the diaphragm causes inefficient operation if not complete inoperativeness of the regulator, thus necessitating renewal of the diaphragm.

Another difficulty often encountered in pressure regulators of the type here described is improper positioning of the connecting means between the valve and the diaphragm when assembling the regulator or removing and replacing the valve. For instance, where the connecting means comprises a yoke, the arms of which straddle an inlet nipple or other part, it is necessary that the yoke be prevented from becoming positioned so that it will bind against or come in contact with the sides of the nipple and thereby prevent free movement of the yoke.

The primary object of the present invention is to prevent any damage or injury to the diaphragm of a fluid pressure regulator by reason of tension or strain thereon caused by removing and replacing the valve of the regulator.

Another important object of the present invention is to assure proper positioning of the regulator parts, particularly the connecting means between the valve and diaphragm so that free movement of said connecting means will be permitted.

Other objects and advantages will become apparent from the following specification and annexed drawings, which describe and illustrate the application of the invention to a well known design of fluid pressure regulator of the diaphragm type. It should be understood that the invention may be applied equally as well to other designs of regulator wherein there is provided a removable valve connected to a diaphragm.

In the drawings:

Figure 1 is a vertical sectional view of a fluid pressure regulator of the diaphragm type.

Figure 2 is a vertical sectional view taken on substantially the line 2—2 of Figure 1.

Figure 3 is a fragmentary vertical sectional view of a regulator showing a modification of the invention, and Figure 4 is a horizontal sectional view taken on substantially the line 4—4 of Figure 3.

Referring to the drawings, in which like numbers indicate like parts, 10 indicates a casing or body portion of a regulator having an inlet 11 and an outlet 12, both of which are provided with threads to accommodate the usual line connections. From the inlet 11 there extends a nipple 13 which forms a chamber within the chamber of the casing. The said nipple is provided with a removable valve seat 14.

The casing 10 as herein illustrated comprises two parts connected by screw threads 15 and between said parts is positioned a diaphragm 16 which is flexible and constructed of relatively fragile material.

A valve 17 seats upon the valve seat 14 and is carried by a connector 18 or, as here shown, by a yoke comprising arms 19 which loosely straddle the nipple 13. The valve is removable and may be secured in any suitable manner to the yoke, as by threads 20. Valves of this character are usually provided with suitable packing as at 21 which seats directly on the valve seat.

At the lower end of the yoke is a base plate 22, a threaded plug 23 which passes through the diaphragm and through an abutment plate 24, and a nut 25 which clamps the diaphragm between the base plate 22 and the abutment plate 23.

A spring 26 is housed in the lower part of the casing and bears against the said abutment plate, thereby exerting pressure against the diaphragm. At the other end of the spring there is an abutment disc 27 and an adjusting screw 28.

The casing, which is open at one end, has a closure cap 29 positioned above the valve which, when removed, gives ready access to the valve side of the regulator for removal and replacement of the valve by means of tools provided for this purpose. It will be further observed that the closure cap has a valve receiving recess at 30 in which the valve slides.

In the operation of the regulator, when the diaphragm spring has been set for the pressures to be handled, the opening and closing of the valve will be automatic and quickly responsive to changes in pressure. In the regulator here shown, outlet pressure at the outlet 12 is exerted on the diaphragm 16 to maintain the valve closed against the pressure of the diaphragm spring 26 until there is a reduction in pressure on the outlet side, thus permitting the spring to move the diaphragm, yoke and valve, whereupon inlet pressure at 11 will flow through the regulator until the pressure on the outlet side is again restored and the valve will again automatically close.

After continued use of a regulator, the valve is likely to become worn, particularly the packing which is made of soft material. In order to assure efficient operation and proper seating of the valve, this packing should be renewed from time to time. Because of corrosion or other reasons, difficulty is often experienced in removing the valve from the connector or yoke for such repair, and after the closure cap has been removed, considerable manipulation or pressure must be applied to the valve. If the valve is secured to the connector or yoke by screw threads, it will be obvious that removal thereof will cause rotational movement of the connector or yoke, and such movement will, in turn, be translated to the diaphragm. Similarly, if the valve is secured to the connector or yoke by other means, any tension or strain such as twisting, pulling, or attempted prying of the valve from the connector or yoke will be translated to the diaphragm. When replacing the valve, there is also likely to be tension and strain imparted to the diaphragm. Since a diaphragm is ordinarily constructed of material which cannot withstand any unusual rotational movement, twisting or other manipulation without injury or damage thereto, it will be readily seen that the diaphragm can be quite easily damaged or injured during the removal and replacement of the valve, thereby causing the regulator to be inefficient or inoperative. The only remedy for this condition is renewal of the diaphragm, which requires disassembling of the regulator and the expense of a new diaphragm.

To prevent damage or injury to the diaphragm, as heretofore described, the present invention comprehends providing means to lock the diaphragm and its connecting means with the valve so that when removing and replacing the valve no tension or strain will be translated to the diaphragm.

Referring to Figures 1 and 2, the nipple 13 is provided on its base portion with a projection 31 and the yoke 18 has between its arms 19 a groove 32. When the regulator is in operation, the movement of the diaphragm, yoke and valve is such that the said projection and groove will not come into contact with each other. However, when the closure cap 29 is loosened to any substantial degree or removed, the pressure of the spring 26 will cause the diaphragm, yoke and valve to move to an extent that the projection and groove will interlock.

After the closure cap is removed, the valve 17 may be unscrewed from the yoke 18 as here illustrated, and any rotational movement imparted to the yoke by this action or by subsequent replacement of the valve, will not cause tension, strain, or damage to the diaphragm. Likewise, when removing and replacing a valve secured to the connector between the diaphragm and valve by means other than screw threads, the diaphragm will not be subjected to any unusual forces such as twisting, pulling, or other manipulations.

It will be understood, of course, that when the operation of removing and replacing the valve takes place, the flow of fluid through the regulator is cut off by the usual valves in the line provided for this purpose.

After the valve has been again secured to the yoke, the closure cap is replaced, which replacement will cause the valve, yoke and diaphragm to be pressed against the spring until their normal operating positions are reached, thereby separating the projection 31 from the groove 32.

In the form of the invention disclosed in Figures 3 and 4, the yoke 18 is provided with projections 33 on its shoulders and the inner wall of the casing adjacent its open end has grooves 34.

The interlocking of the yoke with the casing by means of said projections and grooves will be effected in the same manner as heretofore described, that is, loosening or removal of the closure cap will permit the diaphragm, yoke, and valve to move under pressure of the spring until the projections and the grooves are interlocked. Thereafter, the valve may be removed from and replaced on the yoke without causing tension, strain, or damage to the diaphragm.

It will be evident, also that during removal and replacement of the valve 17, the yoke 18 will be positively positioned at right angles to the axis of the inlet nipple 13. Thus, there will be no possibility of the lower threaded extension 23 of the yoke turning in the nut 25 and causing the arms of the yoke to bind against or come in contact with the nipple, in which case free movement of the yoke would be prevented.

It will be apparent that the present invention is highly advantageous in assuring efficient operation and in facilitating low-cost maintenance of fluid pressure regulators of the diaphragm type. Moreover, in all forms of the invention the connector or yoke is free from contact with the casing during the normal operation of the valve, and the complementary locking means only engage each other when the valve is moved to its inoperable position in order to prevent tension or damage to the diaphragm when removing and replacing the valve.

The invention may be embodied in other forms of fluid pressure regulators of the diaphragm type without departing from the spirit or essential characteristics thereof. Such departures from the construction here shown as may involve merely changes in the design of the regulator or substitution of equivalents or expedients other than those herein set forth, may be made without departing from the scope of the invention.

I claim:

1. In a fluid pressure regulator, a casing open at one end and having an inlet and an outlet, a closure cap secured to the open end of the casing, an inner wall of the casing adjacent the open end thereof provided with a plurality of grooves, a diaphragm subject to fluid pressure, a yoke connected with the diaphragm, a plurality of lateral projections on the shoulders of the yoke, said projections interlocking with the grooves in the casing when the yoke moves into contact with the casing.

2. In a fluid pressure regulator, a casing forming a chamber and having an inlet and an outlet, said inlet having a nipple positioned within the casing and provided with a valve seat, a diaphragm secured to the casing and positioned below said nipple, a yoke connected with the diaphragm, a valve removably secured to the yoke and movable in engagement with said valve seat, the bottom of said nipple and the adjacent side of said yoke having complementary interlocking means normally spaced out of engagement, and means for moving the yoke to engage the interlocking means so as to remove the valve without subjecting the diaphragm to tension.

3. In a fluid pressure regulator, a casing forming a chamber and having an inlet and an outlet, said inlet having a nipple positioned within the casing and provided with a valve seat, a diaphragm secured to the casing and positioned below said nipple, a yoke connected with the diaphragm, a valve removably secured to the yoke and movable in engagement with said valve seat, said nipple having a projection, said yoke having a groove normally spaced from said projection and arranged to engage the same, and means for moving the groove into locking engagement with said projection so as to remove the valve without subjecting the diaphragm to tension.

4. In a fluid pressure regulator, a casing having an inlet and an outlet, said inlet having a valve seat positioned within the casing, a diaphragm in said casing subject to the pressure of the fluid therein, a yoke connected with the diaphragm, a valve removably connected to the yoke and arranged to engage said seat, resilient means in said casing for urging the valve away from said seat, one of the walls of said casing and said yoke having a groove and the other of said walls and said yoke having a projection arranged to interlock with said groove, said groove and projection being maintained out of interengagement during operation of the regulator and being movable into interengagement by said resilient means, when inlet pressure is cut off, to prevent transmission of damaging forces to said diaphragm when removing and replacing said valve.

5. In a fluid pressure regulator, a casing having an inlet and an outlet, said inlet having a valve seat positioned within the casing, a diaphragm in said casing subject to the pressure of the fluid therein, a yoke connected with the diaphragm, a valve removably connected to the yoke and arranged to engage said seat, resilient means in said casing for urging the valve away from said seat, the inner wall of said casing adjacent the valve having spaced diametrically disposed grooves, and said yoke having diametrically spaced projections arranged to interlock with said grooves when the valve is moved away from its seat a distance greater than that occurring during operation of the regulator.

LORIN E. GROSBOLL.

REFERENCES CITED

The following references are of record in the file of this patent:

UNITED STATES PATENTS

| Number | Name | Date |
| --- | --- | --- |
| 483,979 | Foster | Oct. 3, 1892 |
| 1,460,301 | Wilkins | June 26, 1923 |
| 1,462,937 | Holton | July 24, 1923 |
| 1,770,192 | Bennett | July 8, 1930 |
| 1,800,995 | Gaunt | Apr. 14, 1931 |
| 2,380,459 | Niesemann | July 31, 1945 |
| 2,487,089 | Anthea | Nov. 8, 1949 |